United States Patent [19]
Case

[11] Patent Number: 5,630,566
[45] Date of Patent: May 20, 1997

[54] PORTABLE ERGONOMIC WORK STATION

[76] Inventor: Laura Case, P.O. Box 883412, 3325 Meadow La., #28, Steamboat Springs, Colo. 80488

[21] Appl. No.: 453,095

[22] Filed: May 30, 1995

[51] Int. Cl.$^6$ .................................................... F16L 3/00
[52] U.S. Cl. ................................ 248/122.1; 248/284.1
[58] Field of Search ................................ 248/122, 125.1, 248/122.1, 125.7, 278.1, 282.1, 284.1

[56] References Cited

U.S. PATENT DOCUMENTS

| | | | |
|---|---|---|---|
| D. 260,400 | 8/1981 | Carvei | D16/44 |
| 422,297 | 2/1890 | Covington | 248/125.1 |
| 1,409,609 | 3/1922 | Stockle | |
| 1,824,813 | 9/1931 | Friedmann | |
| 2,696,963 | 12/1954 | Shepherd | 248/125.1 |
| 3,533,583 | 10/1970 | Azim | |
| 3,662,981 | 5/1972 | Hogrebe | 248/278.1 |
| 3,724,798 | 4/1973 | Lucascy | 248/418 |
| 3,746,776 | 7/1973 | Monahan et al. | 174/45 R |
| 3,888,333 | 6/1975 | Yamaguchi | 181/143 |
| 4,365,561 | 12/1982 | Tellier | 108/7 |
| 4,487,389 | 12/1984 | Ziegler | 248/282 |
| 4,638,969 | 1/1987 | Brown | 248/122 |
| 4,848,710 | 7/1989 | Newman | 248/129 |
| 4,986,501 | 1/1991 | Simon | 248/122 |
| 5,126,928 | 6/1992 | Hughes | 248/278.1 |
| 5,348,324 | 9/1994 | Trotha | 280/35 |
| 5,421,548 | 6/1995 | Bennett et al. | 248/278.1 |

OTHER PUBLICATIONS

1995, Document "2014–Case" Ergotron Catalog Ergotron Inc., 1181 Trapp Rd. St. Paul, MN 55121.

*Primary Examiner*—Leslie A. Braun
*Assistant Examiner*—Willie Berry, Jr.
*Attorney, Agent, or Firm*—Tom Hamill, Jr.

[57] ABSTRACT

A potable ergonomic computer workstation is disclosed which will permit a disabled individual to operate a computer in a convenient and comfortable fashion from a bed, wheelchair, any chair or standing. The workstation is potable and includes a variety of adjustable support elements which may hold and support computer components including the keyboard, screen, mouse and pad, as well as the computer itself. Other electronic elements, such as a printer, fax machine, copier, television etc. may be employed with the workstation as well. The workstation includes a plurality of articulating arm elements which may be adjusted to a such a configuration to permit a standing, bed borne, or wheelchair borne individual to be able to utilize the computer from a standing position, bed or wheelchair. The articulating arm elements are supposed by a central shaft member which in turn is supposed by a base. The central shaft member has a hollow center to hold various electrical wires (ie: fiber optic, analogous digital, video and audio) for the electronic devices. The base includes a plurality of wheels to permit the workstation to be easily moved about. The wheels include braking elements which may be locked to secure the workstation in position. The workstation may include paper securing means, lighting means and may be utilized by individuals who are not disabled.

15 Claims, 3 Drawing Sheets

PORTABLE ERGONOMIC WORK STATION

BACKGROUND OF THE INVENTION

1. Field of the Invention

The present invention relates generally to computer work stations, and more particularly, to a portable ergonomic work station especially adapted to permit disabled, handicapped or immobilized individuals to utilize a computer both comfortably and conveniently.

2. Description of the Prior Art

At the present time, personal computers are being utilized in a wide variety of tasks, including employment, recreation and study. Currently, the computer monitor and keyboard are placed on a desk or other support, and the computer is connected to the aforementioned components and is generally placed under the desk or support. A healthy person may utilize such a device with generally no difficulties; however, current doctrine indicates the employment of ergonomic support devices to prevent chronic disorders in healthy users and is becoming de rigueur. While such devices are often well designed and work well for a healthy person, they are not suited for people suffering from a variety of disabilities. In particular, those suffering from a temporary or chronic disorder of the back may be confined to a wheelchair or bed, lying in a prone position, or those who must change bodily positions at regular intervals may not be served by such prior art devices. While confined to bed or a wheelchair, or standing, such a disabled person could not operate a computer supported on a conventional support device without difficulty and often pain. This is due to the fact that the monitor and keyboard are at geometric angles to the user which are totally inappropriate to the users condition.

Devices have been disclosed which permit a user to utilize a personal computer while bedridden. One such device is U.S. Pat. No. 4,848,710 which permits a person who is sitting up in bed to operate a computer. Although this device certainly has application to a bedridden individual, it does not address the issue of a person who is confined to a wheelchair, a person lying in a prone position, a person in various chairs or a person who must utilize a computer while standing.

U.S. Pat. No. 4,638,969 discloses a stand for a computer monitor and keyboard which is secured by a stand to the floor. This device is designed to be employed by a worker in a manufacturing environment. This device is not portable, nor does it employ means to adjust the monitor and keyboard to the most desirable position for the user.

Thus, while the foregoing body of prior art indicates it to be well known to use stand and shelving elements to support a computer the provision of a device to support a computer and all associated peripherals, including keyboard, screen and other electronic devices, which may be employed by either a person confined to a bed, wheelchair, or various body positions is not contemplated. Nor is a device contemplated which may be employed by a person standing or reclining in their favorite chair, which permits the human interface elements of the computer system to be placed in their most comfortable and ergonomic position during their use. The foregoing disadvantages are overcome by the unique adjustable, and pivotable arms of the instant invention as will be made apparent from the following description thereof. Other advantages of the present invention over the prior art also will be rendered evident.

SUMMARY OF THE INVENTION

To achieve the foregoing and other advantages, a portable ergonomic computer workstation, briefly described, provides a device which will permit a disabled individual to operate a computer in a convenient and comfortable fashion from a bed, wheelchair, or in a sitting or standing position. The workstation is portable and includes a variety of adjustable support elements which may hold and support computer components including the keyboard, light weight screen, mouse and pad, text holder, as well as the computer itself. Other electronic elements, such as a printer, fax machine, copier, television etc. may be employed with the workstation as well. The workstation includes a plurality of articulating arm elements which may be adjusted to such a configuration to permit a standing, bed borne, or wheelchair borne individual to be able to utilize the computer from a standing position, bed or wheelchair. The articulating arm elements are supported by a central shaft member, the central shaft member being vertically oriented, which in turn is supported by a base. The articulating arms are generally horizontally oriented to the central shaft member and may be moved up and down on the central shaft member. The articulating arms each have a holding means on their distal ends, these holding means for securing a computer element such as a keyboard, screen, etc. The holding means may swivel and rotate in several planes, to permit a keyboard to be placed in an appropriate position for typing and to place the screen at an appropriate position for viewing etc., thereby allowing for multiple positions. The holding means will permit an adjustment of the position of the computer element at the distal end of the articulating arms. (The proximal end of the articulating arms are secured to the central shaft member and are adjustable vertically on the central shaft.) The articulating arms include pivot and rotation means which permit the arms to be moved and adjusted to most conceivable positions. The central shaft member has a hollow center to hold various electrical wires (ie: fiber optic, analog, digital, video or audio) for the electronic devices. The base includes a plurality of wheels to permit the workstation to be easily moved about. The wheels include braking elements which may be locked to secure the workstation in position. The workstation may include paper securing means, lighting means and may be utilized by individuals who are not disabled. The central shaft element may be telescoping, permitting the central shaft to collapse, permitting a greater portability of the unit. Another possible embodiment would have the central shaft of the instant invention suspended from the ceiling in recessed tracks. This would decrease portability; however, would permit greater weight bearing capacity for the unit. Also, it is proposed that the arms which bear the discrete components may also include telescoping members, which would permit their length to be reduced or extended.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the 3 preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable ergonomic computer workstation which may be utilized efficiently and comfortably by a movement disabled individual, such as an individual confined to bed or to a wheelchair.

It is an object of the invention to provide a new and improved portable ergonomic computer workstation which has a central shaft on a wheeled base, with a plurality of arms adjustably mounted on the central shaft, with various computer elements adjustably mounted on the distal arm members.

It is an object of the invention to provide a new and improved portable ergonomic computer workstation which has all of the advantages of the prior art and none of the disadvantages.

It is another object of the present invention to provide a new an improved portable ergonomic computer workstation which may be easily and efficiently manufactured and marketed.

It is a further objective of the present invention to provide a new and improved portable ergonomic computer workstation which is of durable and reliable construction.

An even further object of the present invention is to provide a new and improved portable ergonomic computer workstation which is susceptible of a low cost of manufacture with regard to both materials and labor, and which accordingly is then susceptible of low prices of sale to the consuming public, thereby making such a portable ergonomic computer workstation available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved ergonomic computer workstation embodying the principles and concepts of the present invention will be described.

Figure 1:
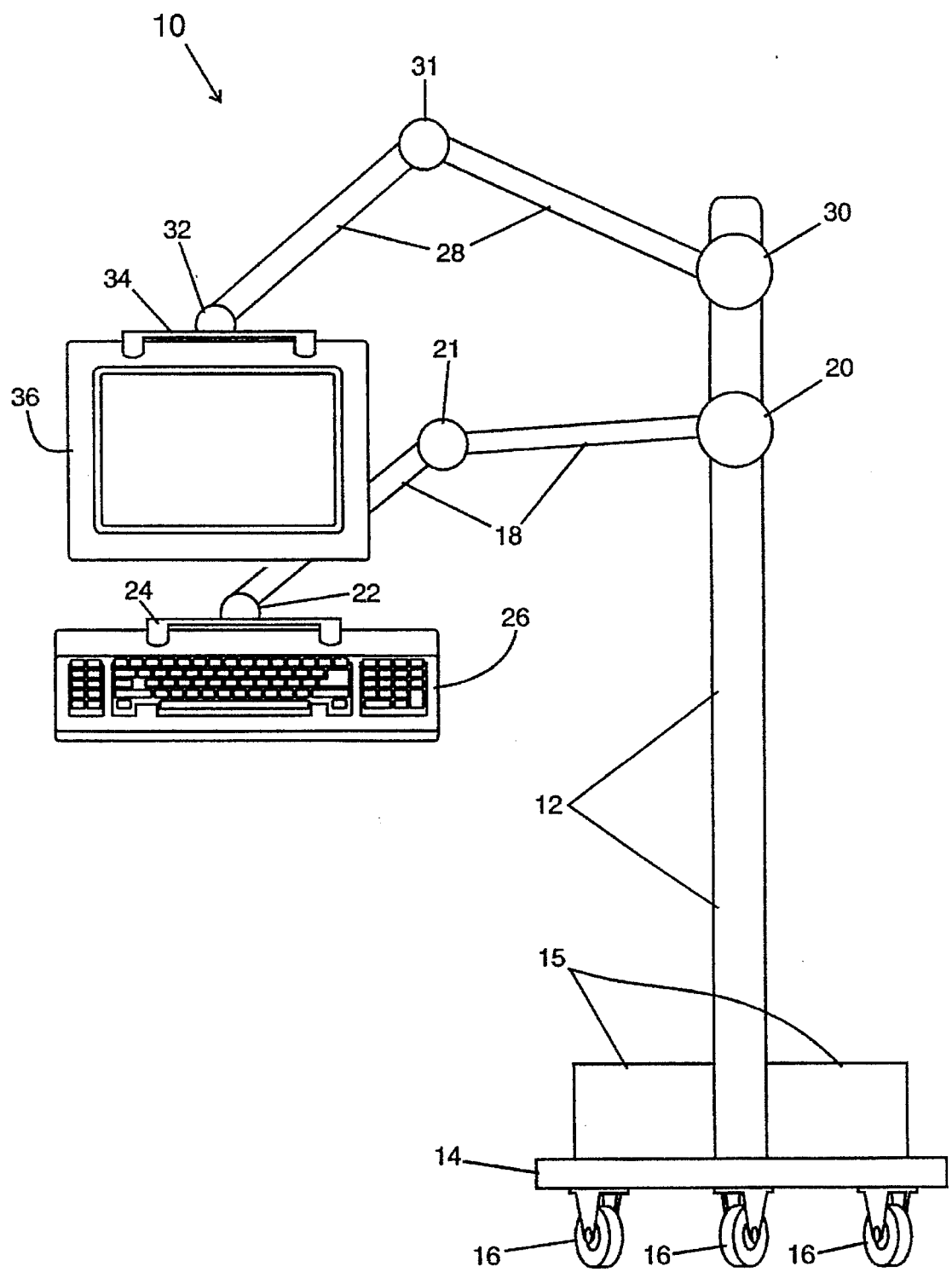
FIG. 1 is a view showing the first preferred embodiment of the ergonomic computer workstation of the invention showing two arms.

Turning initially to FIG. 1, there is shown a first exemplary embodiment of the ergonomic computer workstation of the invention generally designated by reference numeral 10. In its preferred form, ergonomic computer workstation 10 comprises generally a central shaft element 12 depending upwardly in a vertical fashion from a platform 14. Platform 14 has a plurality of wheeled elements 16 which permits the computer workstation 10 to be moved from one location to another. A first arm 18 is connected to the central shaft element 12 at first shaft connection element 20. First shaft connection element 20 may swivel about central shaft element 12, as well as pivot in an up and down fashion. The first shaft connection element 20 may be adjustable vertically on central shaft element 12, by any conventional means, including, but not limited to, screw securing, friction fit or camming action.

First arm 18 is connected to the keyboard support means 24 by keyboard connection means 22. It is envisioned that the keyboard connection means 22 may be such to permit a swivel type rotation motion which may be characterized as a right to left rotational motion, which would also permit the keyboard to be inverted as well. The keyboard connection means 22 is located on the distal end of the first arm 18 whereas the first shaft connection element 20 is located on the proximal end of the first arm 18. A computer keyboard 26 is supported by the keyboard support means 24. The keyboard support means 24 is envisioned to be fastened to computer keyboard 26 with a swivel head which maximizes the ability of the computer keyboard 26 to assume any of a variety of positions. The computer keyboard 26 may be a laptop computer, which would obviate the need for a computer to be supported on platform 14. The keyboard support means 24 is such that a person may type on the keyboard 26 without imparting excessive vibration or motion to the keyboard 26. This is accomplished by choosing first arm 18 to be constructed of a material which has a sufficient modulus of elasticity which will preclude a large displacement due to bending. Other suitable means may be provided to prevent excess vibration to the keyboard 26. Intermediate keyboard connection means 22 and first shaft connection element 20 is a first arm pivot means 21. This permits further adjustment of the position of first arm 18, permitting the keyboard 26 to be brought into the most advantageous position for the user.

A second arm 28 is connected to the central shaft element 12 at second shaft connection element 30. Second shaft connection element 30 may also swivel about central shaft element 12, as well as pivot in an up and down fashion. The second shaft connection element 30 may be adjustable vertically on central shaft element 12, by any conventional means, including, but not limited to, screw securing, friction fit or camming action.

Second arm 28 is connected to the screen support means 34 by screen connection means 32. It is envisioned that the screen connection means 32 may be such to permit a swivel type rotation motion. The screen connection means 32 is located on the distal end of the second arm 28 whereas the second shaft connection element 30 is located on the proximal end of the second arm 28. A computer screen 36 is supported by the screen support means 34. The screen support means 34 is such that a person may adjust the screen 36 to a stationary position without excessive bending of second arm 28. This is accomplished by choosing the second arm 28 to be constructed of a material which has a sufficient modulus of elasticity which will preclude a large displacement due to bending. This problem is solved by utilizing a screen which is light, such as a laptop computer screen as opposed to a full scale monitor. Other suitable means may be provided to prevent excess vibration to the screen 36. Intermediate screen connection means 32 and second shaft connection element 30 is a second arm pivot means 31. This permits further adjustment of the position of second arm 28, permitting the screen 36 to be brought into the most advantageous viewing position for the user.

The first arm 18 and the second arm 28 move independently of one another. The first arm 18 and the second arm 28 will include means to secure the arms in a final preferred location, at any point in time. These means may include a knob which will lock the arm in a desired location or other equivalent means. The keyboard support means 24 and the screen support means 34 may include a sleeve type retaining means, with a back element connected to clips which would permit the keyboard 26 or the screen 36 to be securely retained thereto. The keyboard 26 and screen 36 may be retained by other equivalent or functionally equivalent means.

An optional computer (CPU) 15 is located on platform 14. This computer may be provided for several reasons, firstly, if the computer keyboard 26 is not a laptop computer, and secondly to provide additional capacity to the laptop computer keyboard, ie networking, memory etc. Means may be provided to secure the computer 15 to platform 14 to prevent the computer 15 from becoming separated from the platform 14 during movement. Keyboard 26 and screen 36 are in communication with the computer 15 through standard computer cables (not shown). It is envisioned in one case that the cables run up through a central orifice located in the shaft 12, and then run down the first and second arms, 18 and 28 respectively, to the keyboard 26 and the screen 36. The cables may be secured to the arms by clips or other such securing elements, to prevent tangling, dangling or other hazards. It may be desirable, however, to employ other arrangements for the cables to be supported on ergonomic computer workstation 10.

Figure 2:
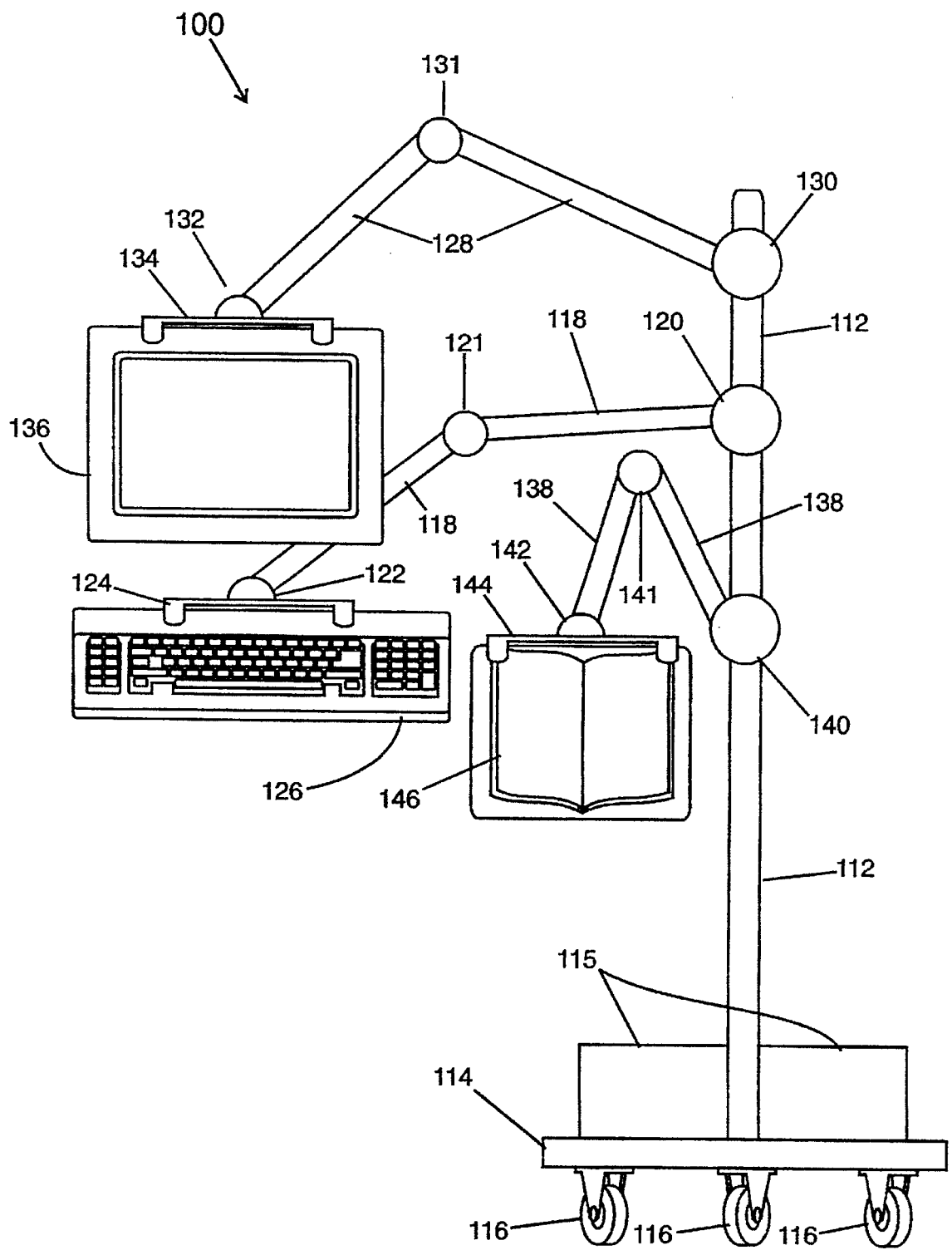
FIG. 2 is a view showing the second preferred embodiment of the ergonomic computer workstation of the invention showing three arms.

Referring now specifically to FIG. 2, a second embodiment of the ergonomic computer workstation 100 is shown. In its preferred form, the second embodiment of the ergonomic computer workstation 100 comprises generally a central shaft element 112 depending upwardly in a vertical fashion from a platform 114. Platform 114 has a plurality of wheeled elements 116 which permits the computer workstation 100 to be moved from one location to another. A first arm 118 is connected to the central shaft element 112 at first shaft connection element 120. First shaft connection element 120 may swivel about central shaft element 112, as well as pivot in an up and down fashion. The first shaft connection element 120 may be adjustable vertically on central shaft element 112, by any conventional means, including, but not limited to, screw securing, friction fit or camming action.

First arm 118 is connected to the keyboard/laptop computer support means 124 by keyboard connection means 122. It is envisioned that the keyboard connection means 122 may be such to permit a swivel type rotation motion. The keyboard connection means 122 is located on the distal end of the first arm 118 whereas the first shaft connection element 120 is located on the proximal end of the first arm 118. A computer keyboard 126 is supported by the keyboard support means 124. The keyboard support means 124 is such that a person may type on the keyboard 126 without imparting excessive vibration or motion to the keyboard 126. This is accomplished by choosing first arm 118 to be constructed of a material which has a sufficient modulus of elasticity which will preclude a large displacement due to bending. Other suitable means may be provided to prevent excess vibration to the keyboard 126. Intermediate keyboard connection means 122 and first shaft connection element 120 is a first arm pivot means 121. This permits further adjustment of the position of first arm 118, permitting the keyboard 126 to be brought into the most advantageous position for the user.

A second arm 128 is connected to the central shaft element 112 at second shaft connection element 130. Second shaft connection element 130 may also swivel about central shaft element 112, as well as pivot in an up and down fashion. The second shaft connection element 130 may be adjustable vertically on central shaft element 112, by any conventional means, including, but not limited to, screw securing, friction fit or camming action.

Second arm 128 is connected to the screen support means 134 by screen connection means 132. It is envisioned that the screen connection means 132 may be such to permit a swivel type rotation motion. The screen connection means 132 is located on the distal end of the second arm 128 whereas the second shaft connection element 130 is located on the proximal end of the second arm 128. A computer screen 136 is supported by the screen support means 134. The screen support means 134 is such that a person may adjust the screen 136 to a stationary position without excessive bending of second arm 128. This is accomplished by choosing the second arm 128 to be constructed of a material which has a sufficient modulus of elasticity which will preclude a large displacement due to bending. This problem is solved by utilizing a screen which is light, such as a laptop computer screen as opposed to a full scale monitor. Other suitable means may be provided to prevent excess vibration to the screen 136. Intermediate screen connection means 132 and second shaft connection element 130 is a second arm pivot means 131. This permits further adjustment of the position of second arm 128, permitting the screen 136 to be brought into the most advantageous viewing position for the user.

A third arm 138 is connected to the central shaft element 112 at third shaft connection element 140. Third shaft connection element 140 may also swivel about central shaft element 112, as well as pivot in an up and down fashion. The third shaft connection element 140 may be adjustable vertically on central shaft element 112, by any conventional means, including, but not limited to, screw securing, friction fit or camming action.

Third arm 138 is connected to the paper support means 144 by paper support connection means 142. The paper support means 144 will permit a paper or book to be secured to the paper support means 144 which will permit the user to easily type draft material. The paper support means 144 may include a plurality of clip elements nested about the perimeter the paper support means 144. One embodiment includes 5 finger type clip elements engaging and securing the paper or book to the paper support means 144. An automated page turner may be provided as well, particularly for those individuals who are unable to turn the pages themselves. It is envisioned that the paper support connection means 142 may be such to permit a swivel type rotation motion. The paper support connection means 144 is located on the distal end of the third arm 138 whereas the third shaft connection element 140 is located on the proximal end of the third arm 138. A page or book 146 is supported by the paper support means 144. The paper support means 144 is such that a person may adjust the book 146 to a stationary position without excessive bending of third arm 138. This is accomplished by choosing the third arm 138 to be constructed of a material which has a sufficient modulus of elasticity which will preclude a large displacement due to bending. Other suitable means may be provided to prevent excess vibration to the book 146. Intermediate paper support connection means 142 and third shaft connection element 140 is a third arm pivot means 141. This permits further adjustment of the position of third arm 138, permitting the book 146 to be brought into the most advantageous viewing position for the user.

A computer 115 is located on platform 114. Means may be provided to secure the computer 115 to platform 114 to prevent the computer 115 from becoming separated from the platform 114 during movement. Keyboard 126 and screen 136 are in communication with the computer 115 through standard computer cables (not shown). It is envisioned in one case that the cables run up through a central orifice located in the shaft 112, and then run down the first and second arms, 118 and 128 respectively, to the keyboard 126 and the screen 136. It may be desirable, however, to employ other arrangements for the cables to be supported on ergonomic computer workstation 100.

The first arm 118, the second arm 128 and the third arm 138 move independently of one another. The first, second, and third arms, 118, 128, and 138 respectively, will include means to secure the arms in a final preferred location at any point in time. These means may include a knob which will lock the arm in a desired location or other equivalent means. The keyboard support means 124, screen support means 134 and book support means 144 may include a sleeve type retaining means, with a back element connected to clips which would permit the keyboard 126, screen 136, or book 146 to be securely retained thereto. The keyboard 126, screen 136 and book 146 may be retained by other equivalent or functionally equivalent means.

Figure 3:
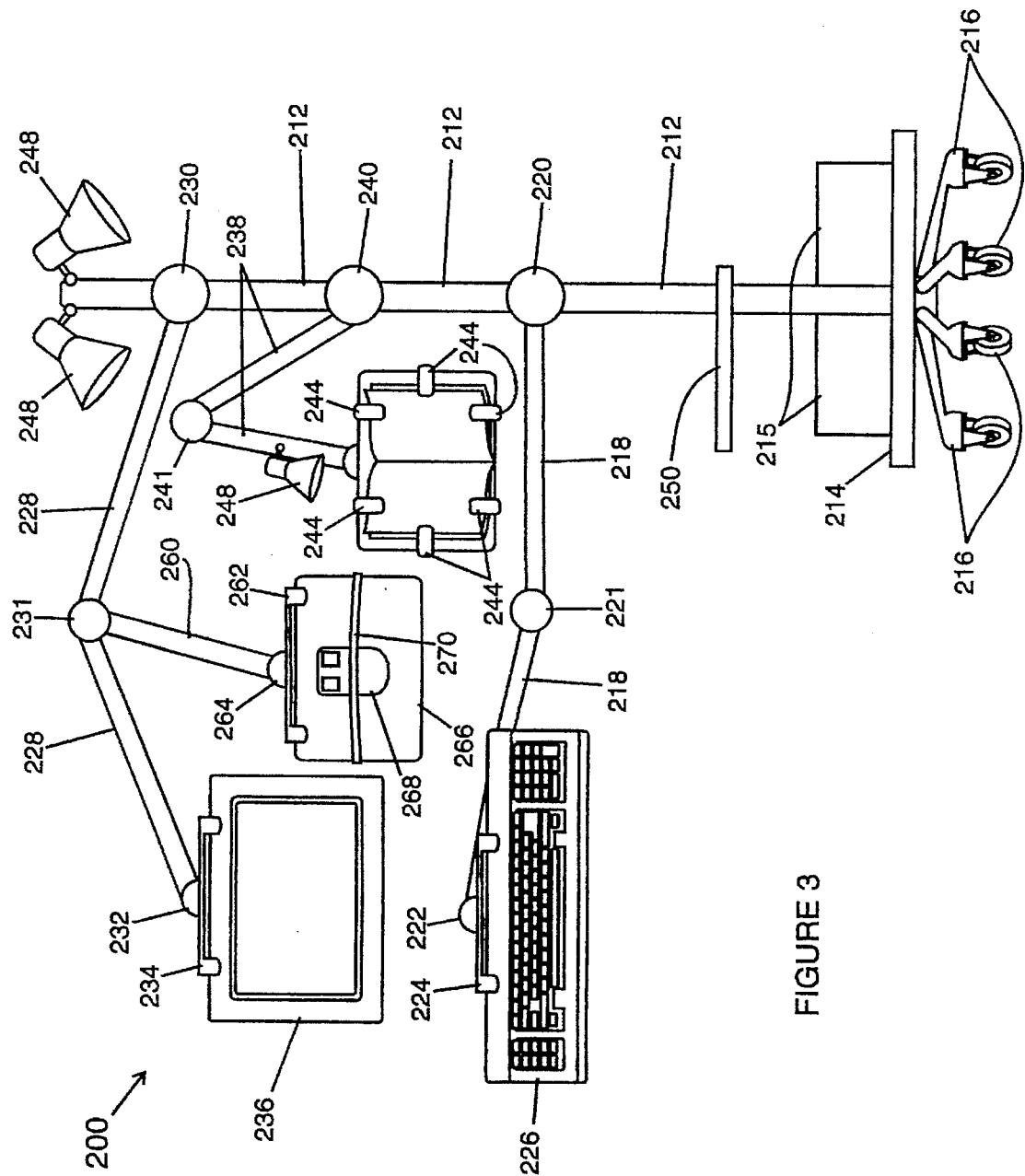
FIG. 3 is a view showing the third preferred embodiment of the ergonomic computer workstation of the invention showing multiple arms and other structure.

Referring now to FIG. 3, there is shown a third exemplary embodiment of the ergonomic computer workstation of the invention generally designated by reference numeral 200. In its preferred form, ergonomic computer workstation 200 comprises generally a central shaft element 212 depending upwardly in a vertical fashion from a platform 214. Platform 214 has a plurality of wheeled elements 216 which permits the computer workstation 200 to be moved from one location to another. A first arm 218 is connected to the central shaft element 212 at first shaft connection element 220. First shaft connection element 220 may swivel about central shaft element 212, as well as pivot in an up and down fashion. The first shaft connection element 220 may be adjustable vertically on central shaft element 212, by any conventional means, including, but not limited to, screw securing, friction fit or camming action.

First arm 218 is connected to the keyboard support means 224 by keyboard connection means 222. It is envisioned that the keyboard connection means 222 may be such to permit a swivel type rotation motion. The keyboard connection means 222 is located on the distal end of the first arm 218 whereas the first shaft connection element 220 is located on the proximal end of the first arm 218. A computer keyboard 226 is supported by the keyboard support means 224. The keyboard support means 224 is such that a person may type on the keyboard 226 without imparting excessive vibration or motion to the keyboard 226. This is accomplished by choosing first arm 218 to be constructed of a material which has a sufficient modulus of elasticity which will preclude a large displacement due to bending. Other suitable means may be provided to prevent excess vibration to the keyboard 226. Intermediate keyboard connection means 222 and first shaft connection element 220 is a first arm pivot means 221. This permits further adjustment of the position of first arm 218, permitting the keyboard 226 to be brought into the most advantageous position for the user, whether the user be standing, sitting in any of a variety of chairs, in a wheelchair or lying in bed.

A second arm 228 is connected to the central shaft element 212 at second shaft connection element 230. Second shaft connection element 230 may also swivel about central shaft element 212, as well as pivot in an up and down fashion. The second shaft connection element 230 may be adjustable vertically on central shaft element 212, by any conventional means, including, but not limited to, screw securing, friction fit or camming action.

Second arm 228 is connected to the screen support means 234 by screen connection means 232. It is envisioned that the screen connection means 232 may be such to permit a swivel type rotation motion. The screen connection means 232 is located on the distal end of the second arm 228 whereas the second shaft connection element 230 is located on the proximal end of the second arm 228. A light weight computer screen 236 is supported by the screen support means 234. The screen support means 234 is such that a person may adjust the screen 236 to a stationary position without excessive bending of second arm 228. This is accomplished by choosing the second arm 228 to be constructed of a material which has a sufficient modulus of elasticity which will preclude a large displacement due to bending. This problem may also be solved by utilizing a screen which is light, such as a laptop computer screen as opposed to a full scale monitor. Other suitable means may be provided to prevent excess vibration to the screen 236. Intermediate screen connection means 232 and second shaft connection element 230 is a second arm pivot means 231. The pivot means 231 permits further adjustment of the position of second arm 228, permitting the screen 236 to be brought into the most advantageous viewing position for the user.

A mouse arm 260 may be connected to the second arm pivot means 231. It may also be connected at another point on the stand, giving the greatest freedom to the user. Mouse arm 260 is connected to the mouse pad support means 262 by mouse pad connection means 264. It is envisioned that the mouse pad connection means 264 may be such to permit a swivel type rotation motion. A mouse pad 266 is supported by the mouse pad support means 262. A computer mouse 268 is attached to the mouse pad 266 by mouse attachment means 270. Mouse attachment means 270 permits the mouse 268 to be moved easily yet remain attached to the vertically oriented mouse pad 266. Mouse attachment means may be a nylon strap which fits about the mouse pad 266. Mouse pad 266 may be manufactured of a plastic with suitable properties and may include rounded edges. It is to be understood that the mouse arm 260 may be attached to other suitable points on the ergonomic computer stand 200 other than the second arm pivot means 231. It is to be understood that the mouse arm 260 and subsequent depending mouse pad 266 etc. may be affixed where the mouse 268 may be most comfortably and efficiently utilized by the user.

A third arm 238 is connected to the central shaft element 212 at third shaft connection element 240. Third shaft connection element 240 may also swivel about central shaft element 212, as well as pivot in an up and down fashion. The third shaft connection element 240 may be adjustable vertically on central shaft element 212, by any conventional means, including, but not limited to, screw securing, friction fit or camming action.

Third arm 238 is connected to the paper support means 244 by paper support connection means 242. The paper support means 244 will permit a paper or book to be secured to the paper support means 244 which will permit the user to easily type draft material. The paper support means 244 may include a plurality of clip elements nested about the perimeter the paper support means 244. It is envisioned that the paper support connection means 242 may be such to permit a swivel type rotation motion. The paper support connection means 244 is located on the distal end of the third arm 238 whereas the third shaft connection element 240 is located on the proximal end of the third arm 238. A page or book 246 is supported by the paper support means 244. The paper support means 244 is such that a person may adjust the book 246 to a stationary position without excessive bending of third arm 238. This is accomplished by choosing the third arm 238 to be constructed of a material which has a sufficient modulus of elasticity which will preclude a large displacement due to bending. Other suitable means may be provided to prevent excess vibration to the book 246. Intermediate paper support connection means 242 and third shaft connection element 240 is a third arm pivot means 241. This permits further adjustment of the position of third arm 238, permitting the book 246 to be brought into the most advantageous viewing position for the user. The book 246 may be secured to the paper support means 244 by a series of metallic or plastic clip elements which may be adjustable. The clip elements being adjustable will permit different sized books or papers to be secured to the paper support means 244. The clips may be transparent as to permit the user to read the words located beneath the clips when the clips overlap the book. Light means 248 may be provided on third arm 238 to facilitate the viewing of book or paper 246 under less than desirable lighting conditions. It is to be understood that the light means 248 may be provided elsewhere on the ergonomic computer stand 200.

A computer 215 is located on platform 214. Means may be provided to secure the computer 215 to platform 214 to prevent the computer 215 from becoming separated from the platform 214 during movement. Keyboard 226, screen 236, and mouse 268 are in communication with the computer 215 through standard computer cables (not shown). It is envisioned in one case that the cables run up through a central orifice located in the shaft 212, and then run down the first, second, and mouse arms, 218, 228, and 260 respectively, to the keyboard 226, screen 236, and mouse 268. It may be desirable, however, to employ other arrangements for the cables to be supported on ergonomic computer workstation 200.

With the recent advent of CD-ROM elements combined with other sound devices on personal computers it is envisioned that a pair of speakers 248 may be mounted to the central shaft element 212. These speakers 248 would also be in communication with the computer 215 through cable means. The cable means may run through the hollow central (vertical) shaft. An adjustable shelf 250 may also be provided on the central shaft element. This shelf 250, which also may be stationary, will support any of a variety of other useful instruments, perhaps including, but not limited to, a telephone, a fax machine, a printer, a copy machine or other electronic or convenience items.

The first arm 218, the second arm 228 and the third arm 238 move independently of one another at any point in time. The first, second, and third arms, 218, 228, and 238 respectively, will include means to secure the arms in a final preferred location. These means may include a knob which will lock the arm in a desired location or other equivalent means. The keyboard support means 224, screen support means 234 and book support means 244 may include a sleeve type retaining means, with a back element connected to clips which would permit the keyboard 226, screen 236, or book 246 to be securely retained thereto. The keyboard 226, screen 236 and book 246 may be retained by other equivalent or functionally equivalent means.

All three embodiments may include means to prevent the workstation from tipping over due to being overweighed on one side. Such means may include counterweights or other elements such as securing bands depending from the central shaft element. Also it is envisioned that the wheeled elements on all embodiments be provided with a stop means. The stop means, when engaged, would prevent the workstation from moving.

It is apparent from the above that the present invention accomplishes all of the objectives set forth by providing a new and improved portable ergonomic computer workstation which may be utilized efficiently and comfortably by a movement disabled individual, such as an individual confined to bed or to a wheelchair, which has a central shaft on a wheeled base, with a plurality of arms adjustably mounted on the central shaft, with various computer elements adjustably mounted on the distal arm members.

With respect to the above description, it should be realized that the optimum dimensional relationships for the pads of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A portable ergonomic work station for supporting computer components in such a fashion to be easily usable by a person whether confined to bed, lying prone in bed, sitting in a chair, confined to a wheelchair or standing, said workstation comprising:
   a platform,
   a vertical shaft, said vertical shaft supported by said platform,
   a first arm member, said first arm member connected to said vertical shaft at a first arm connection means, said first arm connection means located on a proximal end of said first arm,
   a second arm member, said second arm member connected to said vertical shaft at a second arm connection means, said second arm connection means located on a proximal end of said second arm,
   said first arm member further having a keyboard mounting means, said keyboard mounting means having a computer keyboard mounted thereon, said keyboard mounting means located on a distal end of said first arm, said second arm member further having a screen mounting means, said screen mounting means having a computer screen mounted thereon, said screen mounting means located on a distal end of said second arm, said first arm member including a first arm pivot means, said first arm pivot means located intermediate said first arm connection means and said keyboard mounting means, said second arm member including a second arm pivot means, said second arm pivot means located intermediate said second arm connection means and said screen mounting means, whereby said first arm member and said second arm member may be adjusted independently of each other in such a fashion to permit a user to utilize said computer keyboard and said computer screen in a comfortable manner despite being confined to bed, in a wheelchair, or in a sitting or standing position.

2. The portable ergonomic work station of claim 1 including a third arm member said third arm member connected to said vertical shaft at a third arm connection means, said third arm connection means located on a proximal end of said third arm, said third arm member further having a book mounting means, said book mounting means designed to receive a book thereon, said book mounting means located on a distal end of said third arm, said third arm member including a third arm pivot means, said third arm pivot means located intermediate said third arm connection means and said book mounting means, whereby said third arm member may be adjusted in such a fashion to permit a user to view the book in a comfortable manner despite being confined to bed, a wheelchair, or in a sitting or standing position.

3. The portable ergonomic work station of claim 2 wherein said book mounting means is adjustable and permits the book to be rotated in a right and left fashion, as well as permits the angle of the book with respect to the user to be varied.

4. The portable ergonomic work station of claim 2 wherein said third arm connection means is adjustable vertically on said vertical shaft.

5. The portable ergonomic workstation of claim 2 wherein said third arm connection means includes rotation means for rotating about said vertical shaft.

6. The portable ergonomic workstation of claim 2 including a light generating means, said light generating means located on said third arm member, said light generating means proximal said book mounting means.

7. The portable ergonomic work station of claim 1 wherein said keyboard mounting means is adjustable and permits the computer keyboard to be rotated in a right and left fashion, as well as permits the angle of the keyboard with respect to the user to be varied.

8. The portable ergonomic work station of claim 1 wherein said screen mounting means is adjustable and permits the computer screen to be rotated in a right and left fashion, as well as permits the angle of the screen with respect to the user to be varied.

9. The portable ergonomic work station of claim 1 wherein a computer is mounted on said platform.

10. The portable ergonomic work station of claim 1 wherein said platform includes a plurality of wheels, said wheels permitting the portable ergonomic work station to be moved from one location to another.

11. The portable ergonomic work station of claim 1 wherein said first arm connection means and said second arm connection means are adjustable vertically on said vertical shaft.

12. The portable ergonomic workstation of claim 1 wherein said first arm connection means and said second arm connection means include rotation means for rotating about said vertical shaft.

13. The portable ergonomic workstation of claim 1 wherein said vertical shaft has a top portion and a lower portion, said top portion including a pair of audio speakers mounted thereon.

14. The portable ergonomic computer workstation of claim 1 wherein said computer keyboard is included as part of a laptop computer.

15. The portable ergonomic computer workstation of claim 1 wherein said computer screen is a lightweight screen, such as those employed on a laptop computer.

* * * * *